Patented Sept. 15, 1931

1,822,978

UNITED STATES PATENT OFFICE

FERDINAND MÜNZ, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

PROCESS OF MAKING FATTY ACID DERIVATIVES

No Drawing. Application filed January 27, 1930, Serial No. 423,882, and in Germany February 7, 1929.

In my copending application Serial No. 423,881 filed on the same date a process is described which comprises acting with an alkylating agent on a water-soluble salt of the sulfuric acid ester of a higher fatty acid containing at least 8 carbon atoms.

The present application relates to a process for producing practically the same products by acting on the same starting materials with a lower monohydroxy alcohol, advantageously with the addition of an acid or acidic salt acting as catalyst.

In order to further illustrate my invention the following example is given, the parts being by weight and all temperatures in centigrade degrees, but it is however to be understood, that my invention is not limited to the particular products nor reacting conditions mentioned therein.

*Example.*—Oleic acid is sulfonated in the usual manner and the reaction product consisting substantially of the sulfuric acid ester of hydroxystearic acid is neutralized. Then it is evaporated so far as possible and mixed with the double quantity of methyl-alcohol, calculated on the weight of the sulfonation mass. Then to the solution thus obtained sulfuric acid is added or the corresponding amount of zinc chloride until an acid reaction and the mass is allowed to stand for about 24 hours. The mass is again neutralized and the excess of methyl alcohol is distilled off. The reaction product corresponding substantially to the hypothetical formula:

$$C_{17}H_{34}(OSO_3H)COOCH_3$$

represents a slightly colored viscous oil soluble in water of Turkey red oil like properties, but distinguished by a remarkable wetting power.

In the same manner the reaction can be carried out with other lower monohydroxy fatty alcohols, such as ethyl-alcohol.

I claim:

1. A process which comprises acting with a lower monohydroxy fatty alcohol on a water-soluble salt of the sulfuric acid ester of a higher fatty acid containing at least 8 carbon atoms.

2. A process which comprises acting with a lower monohydroxy fatty alcohol in presence of an acidic compound acting as catalyst on a water-soluble salt of the sulfuric acid ester of a higher fatty acid containing at least 8 carbon atoms.

3. A process which comprises acting with a lower monohydroxy fatty alcohol in presence of an acidic compound acting as catalyst on a water-soluble salt of the sulfuric acid ester of a higher fatty acid containing at least 18 carbon atoms.

4. A process which comprises acting with methyl alcohol in presence of an acidic compound acting as catalyst on a water-soluble salt of the sulfuric acid ester of a higher fatty acid containing at least 18 carbon atoms.

In testimony whereof, I affix my signature.

FERDINAND MÜNZ.